Nov. 13, 1962  W. E. McFARLAND ET AL  3,063,158
PROCESS FOR PREVENTING CAKING OF SUGAR
Filed Nov. 25, 1959

INVENTORS
WILLIAM E. McFARLAND
ADAM E. GAMBEL

BY Cushman, Darby & Cushman
ATTORNEYS 3,063,158
PROCESS FOR PREVENTING CAKING OF SUGAR
William E. McFarland and Adam C. Gambel, New Orleans, La., assignors to Southern Industries Corporation, Mobile, Ala., a corporation of Alabama
Filed Nov. 25, 1959, Ser. No. 855,374
1 Claim. (Cl. 34—32)

This invention relates to a novel process and apparatus for preventing the hardening or caking of granular material such as sugar, feed, grains, fertilizer, organic and inorganic chemicals. More particularly, this invention describes a process and apparatus for shipping or storing sugar or the like in bulk shipments in vehicles such as air-slide cars, hopper cars, tank cars, tank trucks and barges.

At the present time, considerable difficulty is experienced when shipping or storing sugar in bulk due to the fact that the sugar cakes and becomes lumpy. Among other obvious disadvantages, this tendency of the sugar to cake makes it difficult to remove same from a transport or storage vessel. The principal object of the present invention is to provide a novel process and apparatus for preventing or minimizing the above mentioned difficulties in the transit or storage of bulk sugar or related materials.

Another more specific object of the present invention is to provide an improved system for transporting or storing particulate material which normally tends to cake on standing, particularly sugar, the system being such as to render it possible to easily discharge the material from the transport vehicle or storage vessel in free-flowing, non-caked form.

Another object of the invention is to provide a system whereby bulk sugar or similar material may be kept free-flowing despite being stored or transported for extended periods of time and under variable temperature and weather conditions.

A further object of this invention is to provide a unique method of removing objectionable moisture from sugar crystals and/or other materials which tend to cake as a result of the presence of such moisture, said removal being accomplished by circulating controlled amounts of dry air through the material in a closed system and under specific conditions of humidity, etc. as described hereinafter.

The caking of sugar and other normally hygroscopic materials, and the resulting difficulties, are due, to a large extent, to the absorption and release of moisture by the material. Thus, in the case of sugar, the moisture in the crystals and at the interfaces of conglomerated crystals is released at a slow rate gradually building up in the area surrounding each sugar crystal, until the relative humidity of the air is above the equilibrium point at which moisture leaves the air and is absorbed onto the sugar. As this moisture concentration increases, some sucrose dissolves in it forming a thin film of syrup. At this point, if the temperature drops, the saturation point of the film of the moisture also drops causing some of the sucrose in this film of syrup to crystallize and cement the larger crystals of the sugar together.

On the other hand, if the temperature of the sugar and air rises sufficiently to permit the relative humidity to drop below the equilibrium point, then a drying action takes place and the moisture is removed from this thin film causing the film to be supersaturated and again sucrose crystallizes out of this film and cements the larger crystals together.

An important aspect of the instant invention is to remove substantially all of the moisture as it is released from the sugar crystals into the surrounding atmosphere. Under such conditions, it is impossible for a film of syrup to form on the surface of the sugar crystals, and consequently, temperature changes will not cause the sugar to cake or become lumpy.

Broadly stated, the objects of the present invention are realized by the provision of a process for storing or transporting sugar or the like in a closed area while avoiding the tendency thereof to cake which comprises withdrawing moist air from the atmosphere immediately surrounding each crystal, removing said moist air from said area, dehumidifying and/or cooling the thus removed moist air so that said air is substantially dry, recycling the resulting dry air to said storage area, percolating said dry air into said area uniformly through the bulk of said crystalline material so that there is a continuous fresh supply of dry air surrounding each particle of sugar.

As the moisture is released and made available to the percolating air stream, it is promptly directed through the container or chamber back to the dehumidifier where it is removed. This effectively prevents any moisture from accumulating in the storage area.

The invention also provides a highly desirable system for carrying out the process outlined broadly above.

The air which is percolated through the bulk sugar or the like must be conditioned so that it is dry enough to insure the proper functioning of the system. The means by which this is accomplished will be discussed with reference to the embodiment illustrated in the drawings. The description adapted thereto is not intended to limit the scope of the invention, but merely to indicate an embodiment thereof.

Referring more particularly to the drawings, a hopper car 1 or the like, is indicated which includes chamber 20 containing the bulk sugar 30. After the sugar or like material is placed within chamber 20, the chamber is closed and should be essentially air tight so that the only air circulated is essentially that originally in the container when the contents are placed therein.

Figure 2:
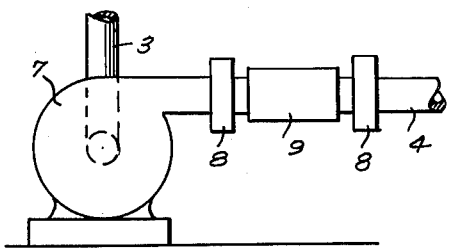
FIGURE 2 is a schematic view of the means by which the air is dehumidified and circulated.

At one end of the hopper car 1, there is provided a blower-dehumidifying unit 2 which is more fully shown in FIGURE 2.

Figure 1:
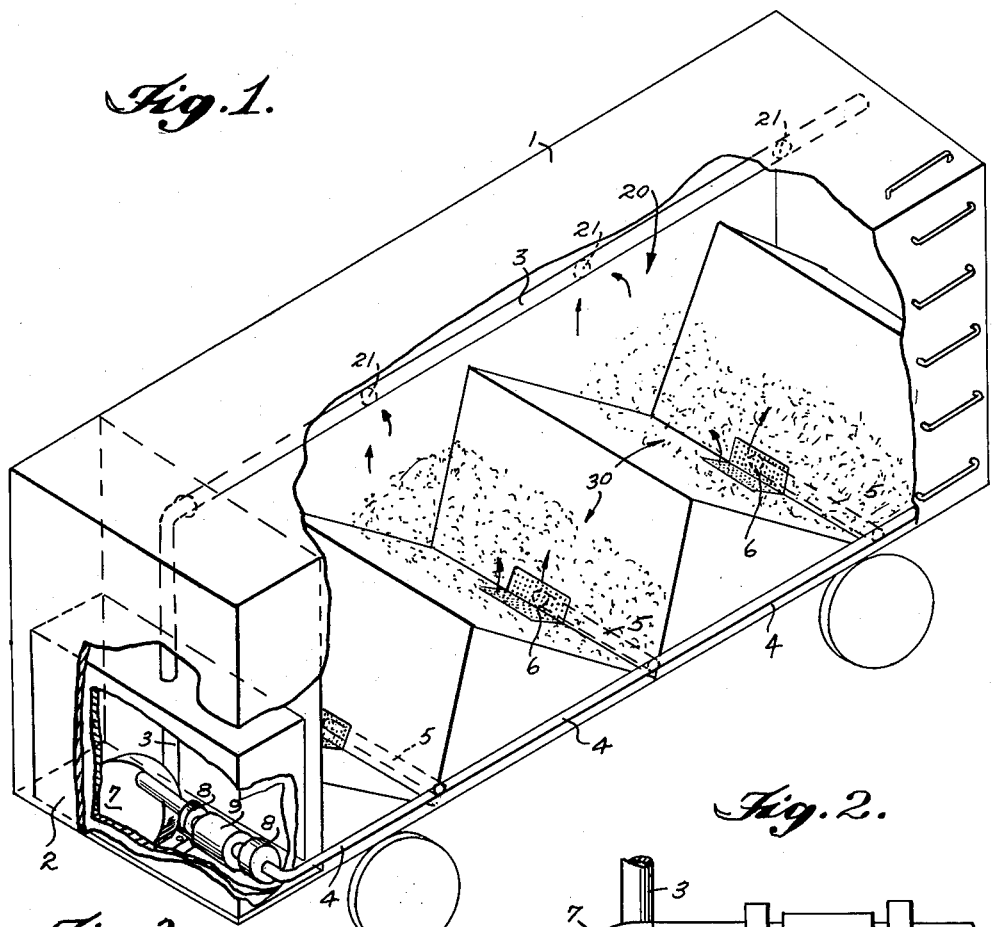
FIGURE 1 is a perspective view with parts broken away, of a hopper car including the features of the present invention.

The relationship of the blower-dehumidifying unit and the conduit passages seen in FIGURE 1 is such that air can be withdrawn from the closed chamber 20 containing the material 30, through a conduit e.g. a pipe 3 containing openings 21, said conduit being located near the top of the vessel and coextensive with the length of the chamber. This conduit leads to the suction side of the blower 7. From the blower 7, the air is forced through the dehumidifier 9 where the moisture is extracted and the substantially dried air then continues on to the bottom of the storage vessel through pipes 4 and 5 where it enters the chamber through breathers 6 and then percolates up through the bed of granular material 30. By the momentum of the influent dried air, the air moisture surrounding the crystals is gently forced to the top of the vessel, where it once again is drawn to the pipes or conduits leading back to the blower.

The suction side of the blower is connected to the top of the vessel with the whole system isolated from the outside atmosphere and any moisture which tends to migrate from one area to another inside the vessel is swept upward to pipe 3 by the moving air steam. By having this pipe 3 running the length of the chamber a uniform removal of air is assured for the location of the ports therein provided that all of the air has the same opportunity to enter pipe 3.

As a modification of the arrangement shown in the drawings and described herein, a plurality of conduits 3 may be disposed in a manner best adapted to the size and shape of the chamber 20. In this connection it may be noted that optimum results may be obtained when the openings 21 in the withdrawal conduit or conduits 3 are disposed evenly throughout the length of the chamber 20.

As a further modificatoin of the arrangement shown in the drawings, the direction of the air may be reversed. In this manner it will, under certain conditions, be easier to effect a uniform movement of air through the product.

Under certain conditions, it may be necessary to use refrigeration to control either the temperature or relative humidity or both within the system. In that instance, a set of cooling coils 8 can be introduced into the system, as illustrtaed, for example, in FIGURE 2.

The blower 7 may be of any suitable conventional design and may be driven either from the axle of the hopper car, from a power take-off on the truck, or from a generator supplying power to a battery. No single specific arrangement of a power source for the blower is intended as being exclusive in this invention since it is apparent that many modifications of this feature are available. The blower size and capacity will depend upon their operating factors, e.g. the size of the storage container or vehicle.

The dehumidifier 9 may comprise a silica gel or activated alumina or similar material which can be regenerated by the application of heat.

Figure 3:
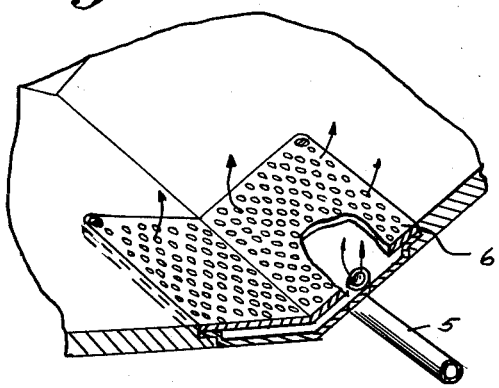
FIGURE 3 is a partial perspective view of the breather assemblies in FIGURE 1.

As noted heretofore, the air supply passes from the dehumidifier and is led conveniently by the pipes 4 and 5 to the breathers 6. These breathers, as shown best in FIGURE 3, may comprise a plurality of filtering screens which are positioned near the bottom of the vessel wherein the granular material is being stored. By virtue of the blower 7, the air supply forcefully passes through the breathers 6, is uniformly dissipated thereby, and percolated gently up through the bulk granular material 30.

Since even the slightest amount of moisture released to the air surrounding the sugar crystals may migrate, and in so doing build up concentrations above the equilibrium point, and cause the sucrose on the surface of the crystal to dissolve, it is imperative that all of the air within the system be subjected to the dehumidifying step. Because the last part of the moisture in the sugar crystals is released at a slow rate, it is possible to affect the last part of the drying operation of sugar by this system.

The temperature of the air is dependent on the temperature of the material to be dried, the surrounding atmosphere, and the temperature of the container and related equipment. The relative humidity of the air is dependent on the temperature and the amount of moisture in the air. The equilibrium point at which moisture will leave the sucrose crystal and be carried away by the air is dependent upon the amount of moisture in the sugar and the relative humidity. From these above relationships, it can be seen that it is necessary to remove enough moisture from the air to substantially reduce the relative humidity below the equilibrium point. Since the water carrying capacity of the air is inversely proportional to the relative humidity, then it follows that the air should leave the dehumidifier as dry as practical for best results.

It is likewise desirable to circulate the air as rapidly as practical but, in the case of sugar, the rates at which the moisture becomes available to the air is relatively slow so that a complete change of air every 3 or 4 hours is ample to keep the sugar in a free flowing condition in a hopper car and a proportionately longer time is ample in larger units.

Obviously various modifications may be made in the invention described herein and the scope of the invention being defined in the following claim wherein what is claimed is:

Method of handling crystalline sugar comprising the steps of: introducing crystalline sugar in unconfined free-flowing form in a hopper car storage space; closing said storage space substantially completely to the outside atmosphere; removing the moisture released by the sugar from the storage space by passing air uniformly through and across the top of the sugar from therebelow, the air passing substantially uniformly upwardly past the sugar crystals, removing this air from said storage space and dehumidifying the same so that the withdrawn air is substantially dry; recycling the dry air back to the storage space and percolating this dry air uniformly upwardly through the mass of crystalline sugar, the relative humidity of the air immediately surrounding the individual sugar crystals being continuously maintained below the equilibrium point at which the moisture from the air is absorbed by the crystalline sugar from said air withdrawing and recycling steps, and transporting said hopper car while removing moisture from said sugar.

References Cited in the file of this patent

UNITED STATES PATENTS

| | | |
|---|---|---|
| 1,281,234 | Musschenbroek | Oct. 8, 1918 |
| 2,219,026 | Webb et al. | Oct. 22, 1940 |
| 2,251,617 | Pirnie | Aug. 5, 1941 |
| 2,360,686 | Johnson | Oct. 17, 1944 |
| 2,584,727 | Mellen | Feb. 5, 1952 |
| 2,696,086 | Jones | Dec. 7, 1954 |
| 2,799,947 | Elwess | July 23, 1957 |

FOREIGN PATENTS

| | | |
|---|---|---|
| 415 | Great Britain | 1870 |
| 622,457 | Great Britain | May 3, 1949 |